US011618492B2

(12) United States Patent
Sa et al.

(10) Patent No.: US 11,618,492 B2
(45) Date of Patent: Apr. 4, 2023

(54) HANDLE ASSEMBLY HAVING POWER ASSIST FUNCTION FOR CARTS AND CART COMPRISING THE SAME

(71) Applicant: LG ELECTRONICS INC., Seoul (KR)

(72) Inventors: Jaecheon Sa, Seoul (KR); Sunryang Kim, Seoul (KR); Keunsik No, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 16/757,617

(22) PCT Filed: Mar. 29, 2019

(86) PCT No.: PCT/KR2019/003748
§ 371 (c)(1),
(2) Date: Apr. 20, 2020

(87) PCT Pub. No.: WO2020/204215
PCT Pub. Date: Oct. 8, 2020

(65) Prior Publication Data
US 2021/0229722 A1 Jul. 29, 2021

(51) Int. Cl.
*B62B 5/00* (2006.01)
*B62B 5/06* (2006.01)
(52) U.S. Cl.
CPC ............. *B62B 5/0073* (2013.01); *B62B 5/06* (2013.01); *B62B 5/0033* (2013.01)

(58) Field of Classification Search
CPC ............... B62B 5/0026; B62B 5/0073; B62B 5/0033; B62B 5/06
See application file for complete search history.

(56) References Cited

U.S. PATENT DOCUMENTS

| 5,746,282 | A | 5/1998 | Fujiwara et al. | |
|---|---|---|---|---|
| 6,276,471 | B1* | 8/2001 | Kratzenberg | B62B 5/0026 180/19.1 |
| 10,906,573 | B2* | 2/2021 | Chung | B62B 5/0073 |
| 2006/0243058 | A1* | 11/2006 | Murakami | B62B 5/0026 73/818 |
| 2011/0313604 | A1* | 12/2011 | Kume | B62B 5/0404 701/22 |
| 2015/0053042 | A1* | 2/2015 | Shirakawa | A61H 3/04 74/523 |
| 2015/0066277 | A1* | 3/2015 | Kojina | B62B 5/0033 180/19.1 |
| 2016/0039446 | A1* | 2/2016 | Sekine | B62B 5/0073 180/11 |

(Continued)

FOREIGN PATENT DOCUMENTS

JP 5-286453 A 11/1993
JP 7-33026 A 2/1995
(Continued)

*Primary Examiner* — Brian L Swenson
(74) *Attorney, Agent, or Firm* — Birch, Stewart, Kolasch & Birch, LLP

(57) ABSTRACT

A handle assembly for a cart with a power assist function can sense the direction that a user's force is applied, and provide assist power in the corresponding direction, such that the user can easily move the cart. A cart including the handle assembly allows the user to conveniently move the cart.

18 Claims, 7 Drawing Sheets

(56) References Cited

U.S. PATENT DOCUMENTS

2018/0244294 A1* 8/2018 Ochiai .................... B62B 5/004

FOREIGN PATENT DOCUMENTS

| | | |
|---|---|---|
| JP | 8-58598 A | 3/1996 |
| KR | 96-37464 A | 11/1996 |
| KR | 10-0189861 B1 | 6/1999 |
| KR | 10-2013-0056879 A | 5/2013 |
| KR | 10-2016-0139830 A | 12/2016 |

* cited by examiner

[FIG. 1]
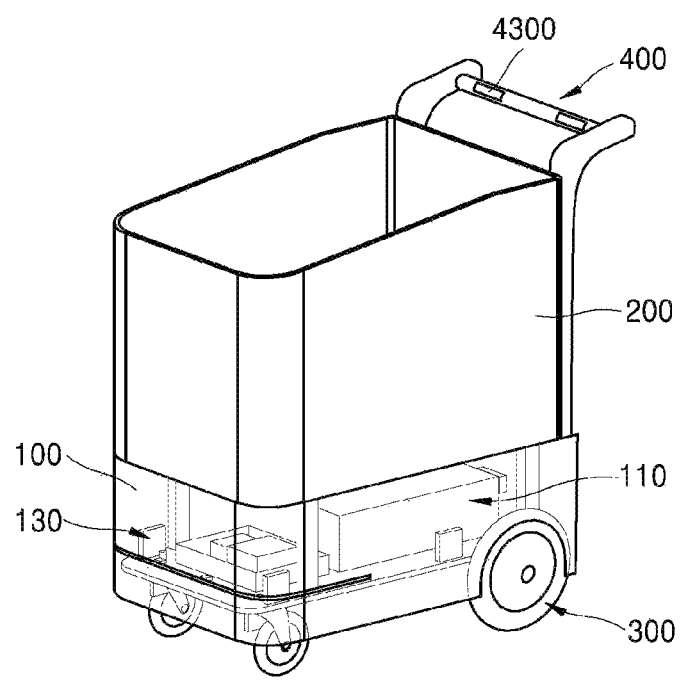

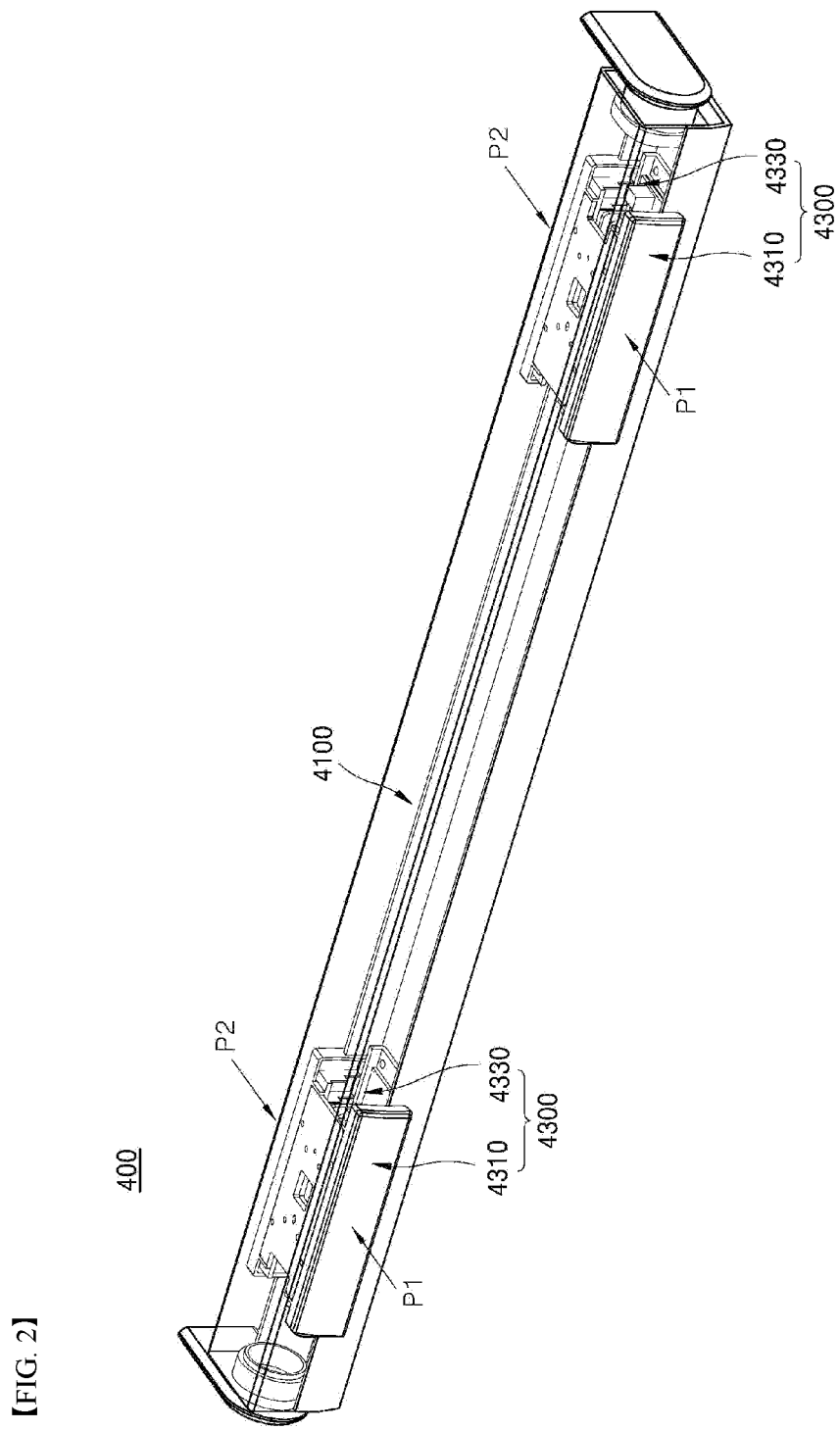
[FIG. 2]

[FIG. 3]
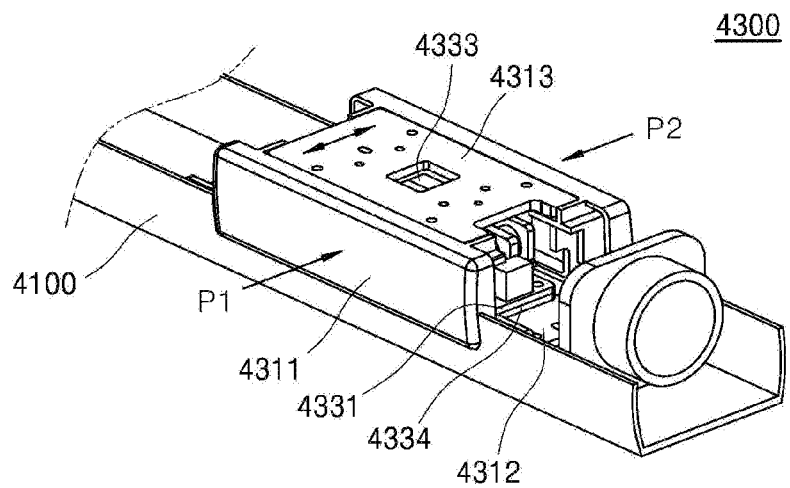
[FIG. 4]
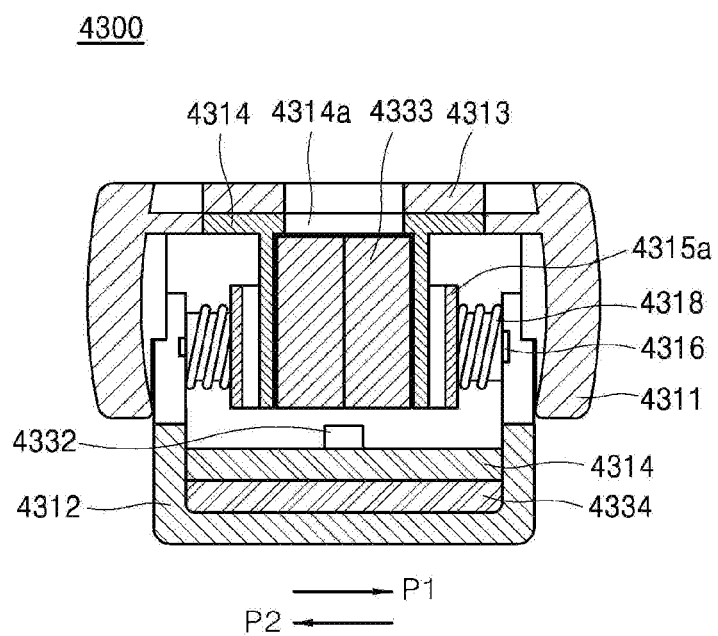

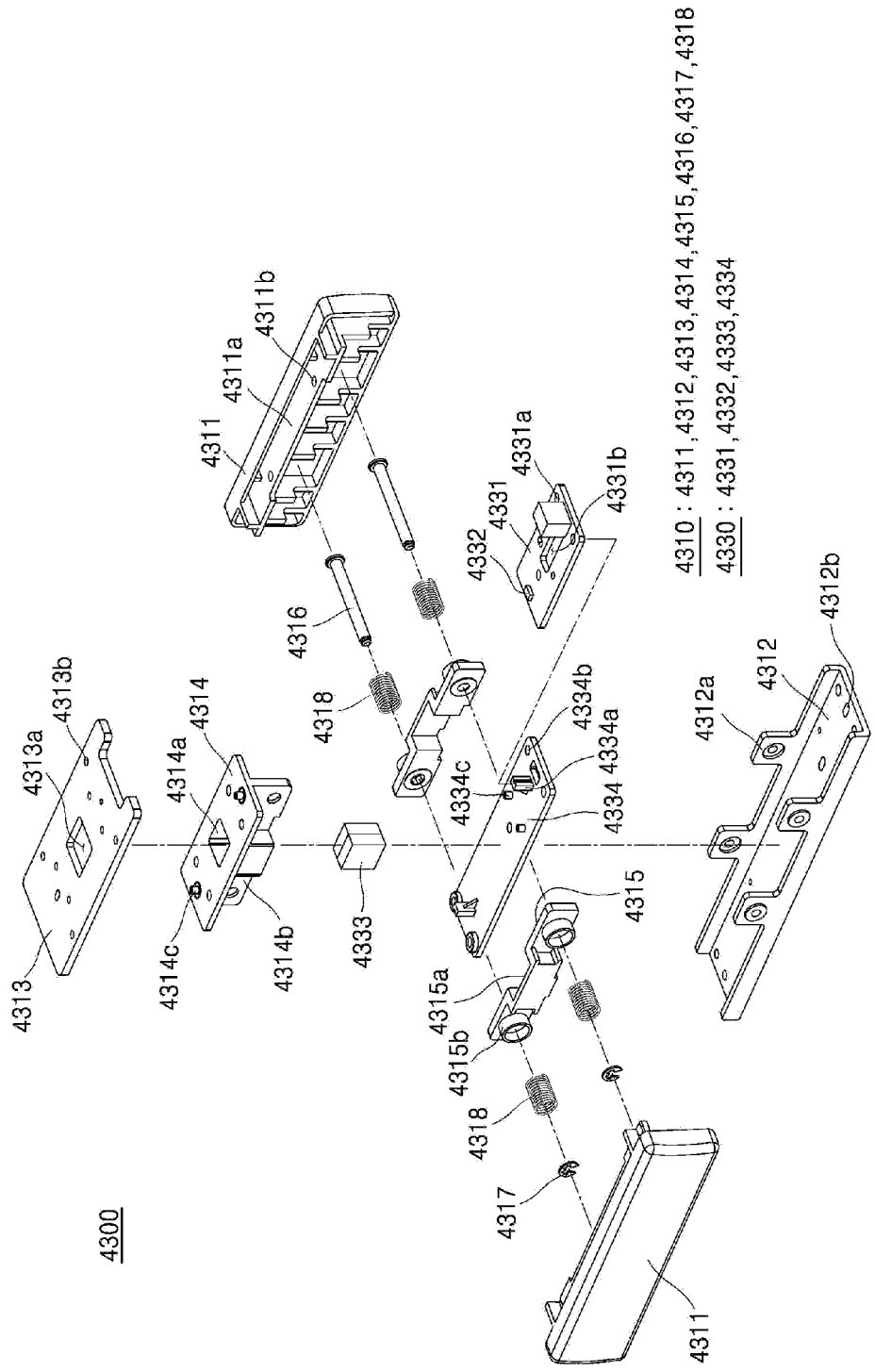
[FIG. 5]

[FIG. 6]
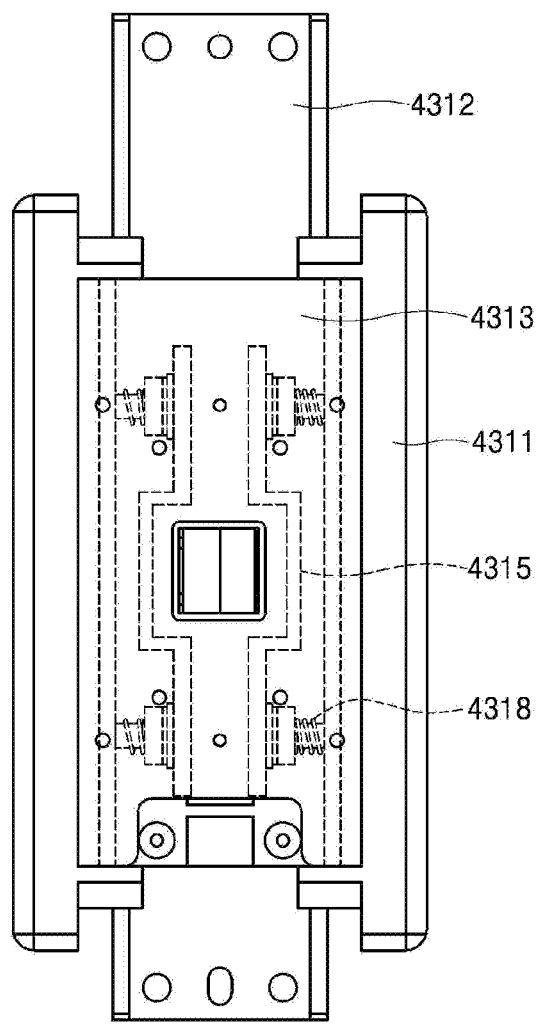

[FIG. 7]
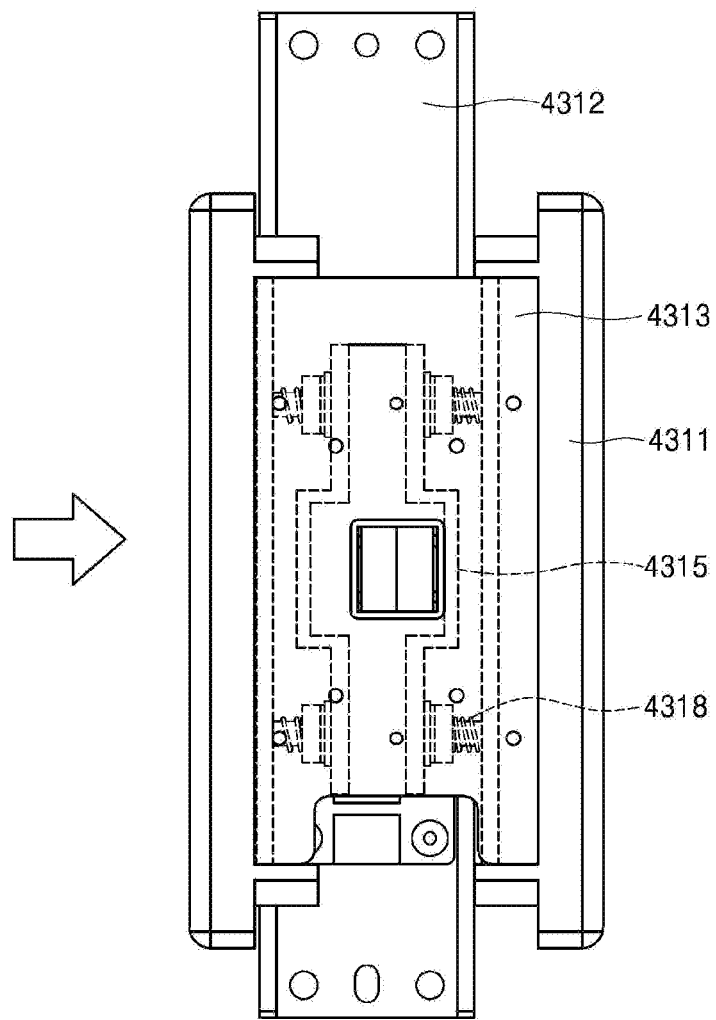

[FIG. 8]
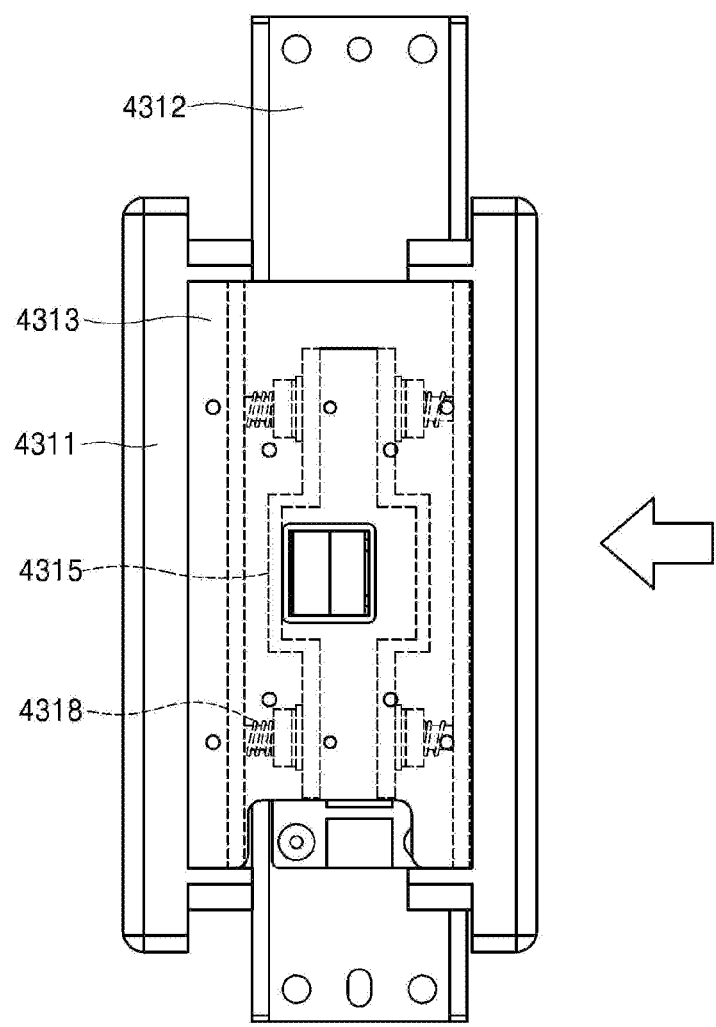

HANDLE ASSEMBLY HAVING POWER ASSIST FUNCTION FOR CARTS AND CART COMPRISING THE SAME

CROSS-REFERENCE TO RELATED APPLICATIONS

This application is the National Phase of PCT International Application No. PCT/KR2019/003748 filed on Mar. 29, 2019, all which are hereby expressly incorporated by reference into the present application.

TECHNICAL FIELD

The present disclosure relates to a handle assembly having a power assist function for carts and a cart comprising the same.

BACKGROUND ART

Various types of carts are used to carry heavy articles or luggage in supermarkets, department stores, airports, and the like.

A cart used in a space for shopping, such as a supermarket or a department store, is provided with a plurality of wheels at a lower portion of a basket for receiving an object such that a user can move the cart by pushing or pulling a handle. Carts used in airports and the like may be similar to such a cart and may further have a brake function.

The cart is a necessary product for user convenience, since the cart allows a user to move without directly carrying a large number of heavy objects. However, if the cart is loaded with an increased number of objects or a heavy object, a user is required to apply large force to the cart in order to move the cart, thereby causing user inconvenience.

Moreover, when the cart is provided with a sensor to sense the direction of force applied for movement of the cart, vibration occurs not only in the horizontal direction but also in the vertical direction due to movement of the cart on the ground, thereby complicating control for accurate sensing. Therefore, there is a need for development of a cart that accurately senses force applied to the cart while avoiding complicated control.

DISCLOSURE

Technical Problem

Embodiments of the present disclosure provide a handle assembly having a power assist function for carts, which can assist in power in a direction of force applied to the cart by a user by sensing the direction of force to allow the user to conveniently move the cart, and a cart comprising the same.

Embodiments of the present disclosure provide a handle assembly having a power assist function for carts, which can assist in power in a direction of force applied to a cart by a user by accurately sensing the direction of force through a simple structure, and a cart comprising the same.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solution

In accordance with one embodiment of the present disclosure, a handle assembly of a cart may include a handle bar receiving external force applied in a direction of the cart to be moved by a user. The handle bar is provided with a force sensing module. The force sensing module may include a frame supporter moving in a direction of the external force input to the handle bar; and a force sensor unit disposed adjacent to the frame supporter and sensing a movement direction of the frame supporter.

The force sensor unit may include a magnet coupled to one side of the frame supporter and moved in a direction corresponding to the direction of the external force by the frame supporter. Here, the magnet is a permanent magnet. In addition, the force sensor unit may include a Hall sensor disposed adjacent to the magnet and sensing a location of the magnet. The Hall sensor may be mounted on a sensor printed circuit board (PCB) and the sensor PCB may determine the direction of the external force based on a sensing result of the Hall sensor.

The frame supporter may include: a pair of cover pads disposed on the handle bar and each being at least partially exposed in front and rear directions of the handle bar; a moving bracket connected at an upper end thereof to the cover pads and receiving the magnet; guide brackets disposed under the moving bracket and supporting a lower side of the moving bracket at opposite sides of the moving bracket; and a plurality of support pins inserted through the moving bracket and lower ends of the guide brackets and supporting the moving bracket to be movable in a movement direction of the cover pads.

The frame supporter may further include a base frame receiving both ends of the support pins inserted thereinto and coupled to an interior of the handle bar.

Each of the moving bracket and the guide brackets may be formed with through-holes through which the support pins pass, and the through-holes may have a larger diameter than the support pins. Accordingly, the moving bracket may be supported by the support pins to be movable in the movement direction of the cover pads.

The force sensor unit may further include a sensor holder bracket coupled to the sensor PCB and formed with a plurality of guide protrusions protruding towards the moving bracket to restrict movement of the guide brackets with the support pins coupled to the moving bracket and the guide brackets.

In accordance with another embodiment of the present disclosure, a cart includes: a main body provided with a drive unit generating electric power and a controller controlling the drive unit; a plurality of wheels coupled to a lower portion of the main body and moving the main body; a handle bar provided to one side of the main body and receiving external force applied in a movement direction of the main body; and a force sensing assembly (module) disposed on the handle bar.

The force sensing module may include: a frame supporter moving in a direction of the external force input to the handle bar; and a force sensor unit disposed adjacent to the frame supporter and sensing a movement direction of the frame supporter, and may communicate with the controller.

The controller may assist in power applied to the cart by transmitting power to the wheels in the movement direction of the frame supporter sensed by the force sensor unit when the power is generated from the drive unit and applied to the cart.

The force sensor unit may include: a magnet coupled to one side of the frame supporter and moved in a direction corresponding to the direction of the external force by the frame supporter, the magnet being a permanent magnet; and a Hall sensor disposed adjacent to the magnet and sensing a location of the magnet. The Hall sensor may be mounted on a sensor PCB.

The sensor PCB may determine the direction of the external force based on a sensing result of the Hall sensor and may transmit a determination result to the controller.

The frame supporter may include: a pair of cover pads disposed on the handle bar and each being at least partially exposed in front and rear directions of the handle bar; a moving bracket connected at an upper end thereof to the cover pads and receiving the magnet; guide brackets disposed under the moving bracket and supporting a lower side of the moving bracket at opposite sides of the moving bracket; and a plurality of support pins inserted through the moving bracket and lower ends of the guide brackets and supporting the moving bracket to be movable in a movement direction of the cover pads.

The frame supporter may further include a base frame receiving both ends of the support pins inserted thereinto and coupled to an interior of the handle bar.

The moving bracket and the guide brackets may be formed with through-holes through which the support pins pass, and the through-holes may have a larger diameter than the support pins. Accordingly, the moving bracket may be supported by the support pins to be movable in the movement direction of the cover pads.

The force sensor unit may further include a sensor holder bracket coupled to the sensor PCB and formed with a plurality of guide protrusions protruding towards the moving bracket to restrict movement of the guide brackets with the support pins coupled to the moving bracket and the guide brackets.

Advantageous Effects

According to embodiments of the present disclosure, the handle assembly allows a user to conveniently move a cart by sensing a direction of force applied to the cart by the user and providing assistant force (power assist function) in the corresponding direction, thereby improving user convenience.

In addition, according to the embodiments of the present disclosure, the handle assembly includes a force sensing module configured to allow the cart to have the degree of moving freedom only in the direction of force applied by a user and thus can be controlled without consideration of noise in the vertical direction. Accordingly, the handle assembly can perform constant and accurate sensing and does not require a complicated control algorithm, thereby providing effects of improving control efficiency while reducing manufacturing costs.

Further, according to the embodiments of the present disclosure, the handle assembly can sense bidirectional force applied to the handle bar through a single force sensing module. Accordingly, the handle assembly does not require a complicated sensor structure for sensing multidirectional force, thereby providing effects of simplifying the structure of the force sensing module while reducing manufacturing costs.

Effects of the present disclosure are not limited to the above-described ones, and one having ordinary skill in the art to which the disclosure pertains may easily draw various effects from the configuration of the disclosure.

DESCRIPTION OF DRAWINGS

FIG. 1 is a perspective view of a cart according to one embodiment of the present disclosure.

FIG. 2 is a perspective view of a handle assembly shown in FIG. 1.

FIG. 3 is a perspective view of a force sensing module in the handle assembly according to one embodiment of the present disclosure.

FIG. 4 is a side view of the force sensing module shown in FIG. 3.

FIG. 5 is an exploded perspective view of a force sensing module shown in FIG. 3.

FIG. 6 is a plan view of the force sensing module shown in FIG. 3.

FIG. 7 and FIG. 8 are plan views illustrating an operation state of the force sensing module shown in FIG. 3.

BEST MODE

The above and other aspects, features, and advantages of the present disclosure will be described in more detail in conjunction with the accompanying drawings so as to fully convey the spirit of the present disclosure to those skilled in the art. Descriptions of known functions and constructions which can unnecessarily obscure the subject matter of the present disclosure will be omitted. Hereinafter, embodiments of the present disclosure will be described in detail with reference to the accompanying drawings. Like components will be denoted by like reference numerals throughout the accompanying drawings.

Herein, when a certain element or component is referred to as being "disposed at an upper portion (lower portion)" or "disposed on (under)" another element or layer, this means that the certain element or component can adjoin an upper (lower) surface of the other element or component or intervening elements or components can be present therebetween.

In addition, when a certain element or component is referred to as being "connected to", "coupled to" or "joined to" another element or component, it means that these elements or components may be directly connected to, coupled to or joined to each other or through another element or component, or another element or component may be "interposed" therebetween.

Hereinafter, the term "cart" means a device that is manually moved under user control or moved by electric power. The cart may have or may not have a function of receiving an object. The cart may be used in shopping spaces, such as supermarkets, department stores, and small and medium-sized stores, leisure spaces, such as golf courses, and traveling spaces, such as airports and ports.

FIG. 1 is a perspective view of a cart according to one embodiment of the present disclosure. FIG. 2 is a perspective view of a handle assembly shown in FIG. 1. FIG. 3 is a perspective view of a force sensing module in the handle assembly according to one embodiment of the present disclosure. FIG. 4 is a side view of the force sensing module shown in FIG. 3. FIG. 5 is an exploded perspective view of a force sensing module shown in FIG. 3. FIG. 6 is a plan view of the force sensing module shown in FIG. 3. FIG. 7 and FIG. 8 are plan views illustrating an operation state of the force sensing module shown in FIG. 3.

Referring to FIG. 1, a cart 10 according to one embodiment includes a main body 100 provided with a drive unit 110 and a controller 130; a receiving portion 200 disposed at one side of the main body 100; a plurality of wheels 300 coupled to a lower portion of the main body 100; and a handle assembly 400 coupled to one side of the main body 100 or the receiving portion 200. The handle assembly 400 includes a handle bar 4100 gripped by a user and a force sensing module 4300 adapted to sense an intended direction of force applied by the user.

The main body 100 may have a substantially hexahedral shape and is provided with various components. The main body 100 may be provided therein with the drive unit 110 that supplies electric power to the wheels 300 and the controller 130 that performs overall control of the cart 10. Although not shown in the drawings, the main body 100 may be provided with various sensors or control devices for driving the cart 10.

The drive unit 110 may include a battery and a motor. The drive unit 110 may supply assistant force to some of the plural wheels 300 under control of the controller 130. When the assistant force is supplied to the wheels 300, the assistant force is additionally applied in a direction of force applied by a user, whereby the user can easily move the cart 10. Herein, the function of supplying assistant force for movement of the cart is defined as a "power assist" function.

The controller 130 may determine the direction of force applied by a user through the force sensing module 4300 disposed on the handle assembly 400 and may control the cart 10 to move in the corresponding direction. Control of the controller 130 may include operation of the drive unit 110, a transmission direction of assistant force generated by the drive unit 110, and a rotational direction of the wheels 300 to which the assistant force is transmitted.

For example, upon sensing that a user intends to move in a front direction, the controller 130 may operate the drive unit 110 to generate drive force and control the transmission direction of the drive force to the wheels 300 such that the wheels 300 rotate in the front direction. Conversely, upon sensing that the user intends to move in a rear direction, the controller 130 may operate the drive unit 110 to generate drive force and control the transmission direction of the drive force to the wheels 300 such that the wheels 300 rotate in the rear direction.

To this end, the controller 130 controls the force sensing module 4300 and the drive unit 110 while communicating therewith. In addition, the controller may directly control the rotational direction of the wheels 300 or may control a power transmission direction of the drive unit 110 connected to the wheels 300 to control the rotational direction of the wheels 300.

The receiving portion 200 may be disposed at an upper side of the main body 100. Alternatively, the receiving portion 200 may be disposed on a side surface, a front surface or a rear surface of the main body 100 according to use place or use purpose of the cart.

The wheel 300 is provided in plural and is rotatably connected to the lower portion of the main body 100. In this embodiment, two wheels 300 are provided to a front side of the main body and two wheels 300 are provided to a rear side thereof. The wheels 300 disposed at the rear side of the main body may be manually rotated when a user pushes the cart 10, or may be semi-automatically or automatically rotated by electric power supplied from the drive unit 110. The wheels 300 at the rear side of the main body may have a larger size than the wheels 300 at the front side thereof.

The handle assembly 400 is disposed at the rear side of the main body 100 and the receiving portion 200. The handle assembly 400 may be coupled to the receiving portion 200 or the main body 100. The handle assembly 400 may include the handle bar 4100 gripped by a user and the force sensing module 4300 disposed on the handle bar 4100. The handle bar 4100 is coupled to the receiving portion 200 or the main body 100 through a separate frame structure.

As shown in FIG. 2, the handle bar 4100 is a straight bar and is composed of a plurality of frames constituting an external appearance thereof. The handle bar 4100 may have an accommodation space defined by the frames. In the accommodation space, the force sensing module 4300 is mounted such that some components of the force sensing module 4300 are partially exposed outside the handle bar 4100.

Referring to FIG. 2, P1 indicates a direction of force applied to the cart 10 by a user attempting to move in a front direction. P2 indicates a direction of force applied to the cart 10 by the user attempting to move in a rear direction. When the user moves in the front direction, the user pushes the cart 10 in the direction P1, and when the user moves in the rear direction, the user pulls the cart 10 in the direction P2. Such a direction of force is sensed through the force sensing module 4300, which in turn sends the sensed result to the controller 130 so as to be used in the provision of the power assist function.

As shown in FIG. 2 to FIG. 5, the force sensing module 4300 includes a frame supporter 4310 and a force sensor unit 4330.

Referring to FIG. 3 and FIG. 5, the frame supporter 4310 includes cover pads 4311 pressed by a user, a base frame 4312 mounted on the handle bar 4100, an upper frame 4313 coupled to the cover pads 4311 to be interposed therebetween, a moving bracket 4314 moved by the cover pads 4311, and guide brackets 4315 movably supporting the moving bracket 4314. A plurality of support pins 4316 and resilient members 4318 resiliently supporting the support pins 4316 are coupled to the guide brackets 4315 (hereinafter, a longitudinal direction and a transverse direction of each component are defined with reference to the longitudinal direction of the handle bar. The longitudinal direction is a direction parallel to the longitudinal direction of the handle bar and the transverse direction is a direction perpendicular to the longitudinal direction of the handle bar).

The cover pads 4311 have a substantially rectangular plate shape and are provided as a pair of cover pads having the same structure and disposed to face each other. Each of the cover pads 4311 has an outer surface exposed outside the handle bar 4100 and an inner surface facing the interior of the handle bar 4100. The outer surface of the cover pad 4311 may be disposed coplanar with one surface of the handle bar 4100 to which the cover pad 4311 is exposed. The outer surface of the cover pad may be formed to have the same radius of curvature as the handle bar 4100 when the handle bar 4100 is formed to have a curved surface. For convenience of description, in the pair of cover pads 4311, a cover pad disposed to face the receiving portion 200 is defined as an inner cover pad 4311 and a cover pad disposed opposite the inner cover pad is defined as an outer cover pad 4311.

The cover pads 4311 are pushed into the handle bar 4100 when pressed by a user. Since the pair of cover pads 4311 is disposed to face each other, it is possible to sense force in both directions P1, P2 through the cover pads 4311 (this structure will be described below). Each of the cover pads 4311 is formed on an inner surface thereof with a guide plate 4311a and a plurality of fastening holes 4311b for coupling of the upper frame 4313.

The guide plate 4311a protrudes from an upper side of the inner surface of the cover pad 4311 in the longitudinal direction of the cover pad 4311. The guide plate 4311a has a plate shape having a predetermined width. The guide plate 4311a has the plurality of fastening holes 4311b formed therethrough. The upper frame 4313 is coupled to the guide plates 4311a by inserting fastening members, such as bolts and the like, into the fastening holes 4311b, with the upper frame 4313 placed on an upper surface of each of the guide plates 4311a.

Since the pair of cover pads 4311 is disposed to face each other, the guide plates 4311a support the upper frame 4313 at opposite sides of the upper frame 4313 in the longitudinal direction. The base frame 4312 is disposed at lower sides of the cover pads 4311 and the upper frame 4313 is disposed at upper sides of the cover pads 4311.

The base frame 4312 is mounted inside the handle bar 4100 and is coupled to the support pins 4316 to support the guide brackets 4315. The base frame 4312 has a plate shape having a greater length than the cover pads 4311 and is bent upwards at opposite edges thereof in the longitudinal direction. An upwardly extended portion of the base frame 4312 is formed with a plurality of pin supports 4312a corresponding to the support pins 4316, respectively. The base frame 4312 is formed on a plate surface thereof with a plurality of fastening holes 4312b to be coupled to the handle bar 4100 by fastening members, such as bolts and the like.

The pin supports 4312a are formed on the base frame 4312 corresponding to coupling locations of the support pins 4316 and are formed with holes into which the support pins 4316 are inserted. The base frame 4312 is formed with two pairs of pin supports 4312a facing each other to support the support pins 4316 at opposite sides thereof.

The upper frame 4313 is disposed to face the base frame 4312 and is coupled to the upper surfaces of the guide plates 4311a formed on the cover pads 4311. The upper frame 4313 serves to connect the pair of cover pads 4311 to each other. To this end, the upper frame 4313 is formed on a plate surface thereof with a plurality of fastening holes 4313b to be coupled to the guide plates 4311a by fastening members, such as bolts and the like. The upper frame 4313 may be formed with a through-hole 4313a at a portion thereof corresponding to a location of a magnet described below. However, it should be understood that the through-hole 4313a is provided to allow convenient insertion of the magnet and can be omitted.

The moving bracket 4314 is mounted on a lower surface of the upper frame 4313. The upper frame 4313 may be formed with a plurality of fastening holes 4313b at portions thereof to be coupled to the moving bracket 4314.

The moving bracket 4314 has a plate shape having a smaller size than the upper frame 4313. The moving bracket 4314 supports the magnet 4333 described below and is coupled to the upper frame 4313. When the cover pads 4311 move, the moving bracket 4314 moves the magnet 4333 while moving together with the upper frame 4313. Since the moving bracket 4314 is coupled to the upper frame 4313 and the upper frame 4313 is supported at opposite ends thereof in the longitudinal direction by the cover pads 4311, force applied to the cover pads 4311 can be evenly transmitted to the moving bracket 4314.

The moving bracket 4314 is formed on an upper surface thereof with a plurality of coupling protrusions 4314c inserted into the fastening holes 4313b of the upper frame 4313. The moving bracket 4314 is formed on the lower surface thereof with a magnet receiving portion 4314a and moving ribs 4314b.

The magnet receiving portion 4314a has a shape corresponding to the shape of the magnet 4333. According to the present disclosure, the magnet receiving portion 4314a may have a hexahedral shape that defines an accommodation space therein and is open at upper and lower sides thereof. Accordingly, the magnet receiving portion 4314a may have a box shape when viewed from the cover pads 4311. The moving ribs 4314b are formed at opposite sides of the magnet receiving portion 4314a.

The moving ribs 4314b extend in the longitudinal direction of the moving bracket 4314 and are disposed perpendicular to the plate surface of the moving bracket 4314. Accordingly, when the moving bracket 4314 is viewed in the transverse direction, the plate surface of the moving bracket 4314 and a cross-section of the moving ribs 4314b form a substantially 'T' shape.

The moving ribs 4314b are formed with holes through which the support pins 4316 are inserted. Accordingly, the plate surface of the moving bracket 4314 is secured to the upper frame 4313 and a lower portion of the moving bracket 4314 is supported to move along the support pins 4316 inserted into the guide bracket 4315. That is, the through-holes formed in the moving ribs 4314b have a larger diameter than the diameter of the support pins 4316, whereby the support pins 4316 do not affect operation of the moving bracket 4314.

As such, the upper portion of the moving bracket 4314 is supported by the cover pads 4311 and the lower portion of the moving bracket 4314 is supported by the guide brackets 4315 and the support pins 4316, thereby enabling stable support. In addition, since the guide brackets 4315 are coupled to the base frame 4312 by the support pins 4316, the moving bracket 4314 can move in the directions P1 and P2 corresponding to the direction of external force. However, the moving bracket 4314 does not arbitrarily move in the vertical direction of the cart 10. Accordingly, a predetermined distance is maintained between the Hall sensor 4332 described below and the moving bracket 4314, thereby enabling stable maintenance of a predetermined distance between the magnet 4333 and the Hall sensor 4332. Accordingly, the force sensing module can achieve stable sensing.

Since the cart 10 moves on a floor in a room or on the ground, the cart 10 undergoes vibration not only in the horizontal direction but also in the vertical direction. Such vibration acts as noise disturbing accurate sensing. Noise becomes a factor causing complicated control. However, according to the present disclosure, the cart 10 has a structure allowing movement of the magnet 4333 only in the horizontal direction, thereby enabling stable maintenance of a constant distance between the magnet 4333 and the Hall sensor 4332. Accordingly, it is possible to achieve stable sensing, improvement in control efficiency and reduction in manufacturing costs through omission of a complicated control algorithm.

The guide brackets 4315 are disposed under the moving bracket 4314 to face each other as a pair of guide brackets having the same shape. Each of the guide brackets 4315 is disposed in the longitudinal direction of the base frame 4312 and has a plate shape having a predetermined length and width. Since the guide brackets 4315 support the moving ribs 4314b at a lower side of the moving bracket 4314, each of the guide brackets 4315 may have a shape corresponding to the shape of the lower portion of the moving bracket 4314.

A central portion of the guide bracket 4315 is bent in a one-side open rectangular shape to form a guide groove 4315*a*.

The guide groove 4315*a* has a shape corresponding to the shape of the magnet receiving portion 4314*a* and is formed by bending the guide bracket 4315 so as to protrude towards the cover pad 4311. The guide bracket 4315 is formed on a plate surface thereof with spring insertion portions 4315*b* at opposite sides of the guide groove 4315*a*. In the spring insertion portion 4315*b*, a hole is formed through the plate surface of the guide bracket.

The spring insertion portion 4315*b* has a cylindrical shape and protrudes from a surface of the guide bracket 4315 facing the cover pad 4311 to receive the resilient member 4318. Since the spring insertion portions 4315*b* are disposed at opposite sides of the guide groove 4315*a*, respectively, each of the guide brackets 4315 is formed with two spring insertion portions 4315*b*. Accordingly, each of the guide brackets 4315 includes two resilient members 4318 and two support pins 4316.

The support pins 4316 have a cylindrical shape. Each of the support pins 4316 includes a head formed at one end thereof and is coupled at the other end thereof to an E-ring 4317. With the resilient member 4318 placed on an outer peripheral surface of each of the support pins 4316, the support pins 4316 are inserted through the pin supports 4312*a* of the base frame 4312 and the spring insertion portions 4315*b* of the guide brackets 4315. Then, the support pins 4316 pass through the guide brackets 4315 facing each other through the moving ribs 4314*b* of the moving bracket 4314. With the same structures disposed to face each other, the support pins 4316 are disposed such that a distal end of each of the support pins 4316 sequentially passes through the spring insertion portions 4315*b*, the resilient members 4318, and the pin supports 4312*a* of the base frame 4312. That is, with the resilient members 4318 inserted into both ends of each of the support pins 4316, the support pins 4316 are inserted into the base frame 4312, the guide brackets 4315 and the moving bracket 4314 to pass therethrough and the E rings 4317 are secured to the ends of the support pins 4316 to prevent the support pins 4317 from being separated from a coupling location.

The support pins 4316 have a length to protrude outside the base frame 4312 in a state of being coupled to the guide brackets 4315 and the moving bracket 4314 (hereinafter, the coupling location). That is, in the coupling location, both ends of each of the support pins 4316 are placed between the base frame 4312 and the cover pads 4311.

In addition, since the moving bracket 4314 and the guide brackets 4315 can be moved with the support pins 4316 coupled thereto, the through-holes formed in the moving bracket 4314 and the guide brackets 4315 have larger diameters than the support pins 4316.

The resilient members 4318 may be coil springs. Two resilient members 4318 may be inserted into one support pin 4316. One end of the resilient member 4318 is received in the spring insertion portion 4315*b* of each of the guide brackets 4315. Thus, both ends of the guide bracket 4315 are resiliently supported by the resilient members 4318. The resilient members 4318 are compressed by external force pressing the cover pads 4311 and are restored upon removal of the external force.

The force sensor unit 4330 is disposed under the guide brackets 4315.

Referring to FIG. 4 and FIG. 5, the force sensor unit 4330 includes a sensor PCB 4331, a Hall sensor 4332 mounted on the sensor PCB 4331, a magnet 4333 mounted on the moving bracket 4314, and a sensor holder bracket 4334 securing the sensor PCB 4331 to the base frame 4312.

The sensor PCB 4331 supports the Hall sensor 4332 and communicates with the controller 130 to send a sensing result of the Hall sensor 4332 to the controller 130. The sensor PCB 4331 may be provided with various circuits for sensing. A plate surface of the sensor PCB 4331 may have a plurality of fastening holes 4331*a* formed therethrough. In addition, the plate surface of the sensor PCB 4331 may be partially perforated to form a cut portion 4331*b*. The Hall sensor 4332 is mounted on an upper surface of the sensor PCB 4331 and the sensor holder bracket 4334 is coupled to a lower surface of the sensor PCB 4331.

Although not indicated by a reference numeral, a box-shaped structure on the sensor PCB 4331 acts as a reference for setting an initial setting location at which the center of the magnet 4333 is aligned with the center of the Hall sensor 4332, and may be modified or omitted.

The Hall sensor 4332 is mounted on the sensor PCB 4331 at a location corresponding to the location of the magnet 4333. Since the magnet 4333 is moved in the front and rear directions of the cart 10 in a state of being coupled to the moving bracket 4314, the Hall sensor 4332 may be disposed corresponding to the center of the magnet 4333 before movement of the magnet 4333.

The Hall sensor 4332 serves to detect variation in a magnetic field resulting from movement of the magnet 4333. When the magnet 4333 moves in the direction P1 or P2, the Hall sensor 4332 senses variation in the magnetic field resulting from movement of the magnet 4333. A sensing result of the Hall sensor 4332 is transmitted to the sensor PCB 4331, which in turn determines the direction of force applied to the cart.

In the state of being coupled to the moving bracket 4314, the magnet 4333 is separated a predetermined distance from the Hall sensor 4332. The magnet 4333 is a permanent magnet and has an N pole and an S pole. Even when the magnet 4333 is moved by the moving bracket 4314, the magnet 4333 is prevented from deviating from a sensing range of the Hall sensor 4332. Thus, the size and location of the magnet 4333 are designed corresponding to the sensing range of the Hall sensor 4332.

The sensor holder bracket 4334 has a plate shape having a greater length than the moving bracket 4314. The sensor holder bracket 4334 is formed on an upper surface thereof with a pair of guide protrusions 4334*a* protruding towards the moving bracket 4314 and a plurality of coupling protrusions 4334*c* coupled to the sensor PCB 4331. In addition, the sensor holder bracket 4334 has a plurality of fastening holes 4334*b* formed through a plate surface of the sensor holder bracket 4334 so as to be fastened to the base frame 4312 by fastening members, such as bolts and the like.

The guide protrusions 4334*a* have a larger size than the coupling protrusions 4334*c* and are disposed between the pair of guide brackets 4315. The guide protrusions 4334*a* serve to restrict movement of the guide brackets 4315 so as to prevent the guide brackets 4315 from being pushed to one side by the moving bracket 4314. Since the moving bracket 4314 can deviate from the sensing range of the Hall sensor 4332 if movement of the guide brackets 4315 is not restricted, movement of the moving bracket 4314 can be restricted by restricting the movement of the guide brackets 4315. Such a structure is conceived to provide the degree of moving freedom to the moving bracket 4314 only in the direction of force applied to the force sensing module 4300. Thus, the guide brackets 4315 are disposed at opposite sides of the guide protrusions 4334*a* such that the guide protrusions 4334a are placed between the guide brackets 4315, the guide brackets 4315 and the guide protrusions 4334a do not contact each other before movement of the moving bracket 4314.

In the above embodiment, the upper frame 4313 and the moving bracket 4314 are separately provided. Alternatively, the upper frame 4313 and the moving bracket 4314 may be integrally formed with each other. The guide brackets 4315 may be integrally formed with the moving bracket 4314 instead of being provided as separate elements. Alternatively, the two guide brackets 4315 may be provided as an integrated element to support the lower side of the moving bracket 4314 at opposite sides of the moving bracket 4314 instead of being provided as a pair of guide brackets.

Next, in the cart according to the embodiment of the present disclosure having the aforementioned configuration, force sensing and a power assist process will be described.

As shown in FIG. 4 and FIG. 6, since the upper frame 4313 and the moving bracket 4314 are not moved before movement of the cart 10, the magnet 4333 is placed between the guide brackets 4315. The Hall sensor 4332 is disposed under the magnet 4333. Here, the resilient members 4318 at opposite sides of each of the guide brackets 4315 are not compressed.

Referring to FIG. 1 to FIG. 3, a user may push the handle bar 4100 in order to move the cart 10 in the front direction. Thus, the user presses the outer cover pad 4311 in the direction P1.

As shown in FIG. 4 and FIG. 7, when the cover pad 4311 receives force in the direction P1, the upper frame 4313 is moved in the direction P1. Since the moving bracket 4314 is coupled to the upper frame 4313, the moving bracket 4314 also moves in the direction P1. As the magnet 4333 received in the moving bracket 4314 also moves in the direction P1, the locations of the Hall sensor 4332 and the pole of the magnet 4333 adjacent thereto are changed. As a result, the Hall sensor 4332 senses variation in a magnetic field generated due to movement of the moving bracket 4314 and the sensor PCB 4331 can determine, based on the sensing result, that force is applied in the direction P1. In the present disclosure, a process of sensing the direction of force applied to the cart is defined as "force sensing".

When the sensor PCB 4331 sends the sensing result to the controller 130, the controller 130 may determine that there is a need for the "power assist" process to supply assistant force in the direction P1. The controller 130 may control the drive unit 110 to generate and transmit electric power to the wheels 300. The wheels 300 are driven by the assistant force generated under control of the controller 130.

For example, assuming that a force applied to the cart 10 by a user pushing the cart 10 is 10, a force of 90 may be additionally supplied to push the cart 10 through the power assist function. Thus, although the cart 10 is moved under conditions of the same force and speed as when the cart 10 is moved by a force of 100, an actual force applied to the cart by the user becomes 10. As such, since the user can move the cart 10 with small force, the handle assembly improves user convenience.

Conversely, referring to FIG. 1 to FIG. 3, a user may pull the handle bar 4100 in order to move the cart 10 in the rear direction. Here, the user presses the inner cover pad 4311 in the direction P2.

As shown in FIG. 4 and FIG. 8, when the cover pad 4311 receives the force in the direction P2, the upper frame 4313 is moved in the direction P2. Since the moving bracket 4314 is coupled to the upper frame 4313, the moving bracket 4314 also moves in the direction P2. As the magnet 4333 received in the moving bracket 4314 also moves in the direction P2, the locations of the Hall sensor 4332 and the pole of the magnet 4333 adjacent thereto are changed. As a result, the Hall sensor 4332 senses variation in a magnetic field generated due to movement of the moving bracket 4314 and the sensor PCB 4331 can determine based on the sensing result that force is applied in the direction P2.

When the sensor PCB 4331 sends the sensing result to the controller 130, the controller 130 may determine that there is a need for the "power assist" process to supply assistant force in the direction P2. The controller 130 may control the drive unit 110 to generate and transmit electric power to the wheels 300. The wheels 300 are driven by the assistant force generated under control of the controller 130.

When an excessive pressure is applied to the cover pad 4311 in the above process, movement of the guide brackets 4315 is restricted by the guide protrusions 4334a formed on the sensor holder bracket 4334. Accordingly, the magnet 4333 is moved in the sensing range of the Hall sensor 4332 and the Hall sensor 4332 can perform stable sensing.

In addition, the force sensing module 4300 is operated in association with the cover pads 4311, the upper frame 4313, the moving bracket 4314, and the guide brackets 4315 coupled to each other, and the moving bracket 4314 is configured to have the degree of moving freedom only in the directions of force applied to the cart (directions P1 and P2). Accordingly, a preset distance can be maintained between the Hall sensor 4332 and the magnet 4333, thereby enabling accurate sensing.

In the above embodiment, when force is applied in the direction P1 or P2, since the Hall sensor 4332 senses application of the force and the controller 130 provides the power assist function, this operation can be referred to as operation in "a power assist mode". When force is not applied in the direction P1 or P2, the controller 130 may determine that a user moves the cart 10 in a manual mode.

Although not shown in the drawings, the handle bar 4100 may include a switch adapted to send power assist mode on/off signals to the controller 130 instead of the Hall sensor 4332 and the magnet 4333. In this structure, a user may manipulate the switch to move the cart in the power assist mode.

Although some embodiments have been described herein with reference to the accompanying drawings, it should be understood that these embodiments are provided for illustration only and are not to be construed in any way as limiting the present disclosure, and that various modifications, changes, alterations, and equivalent embodiments can be made by those skilled in the art without departing from the spirit and scope of the present disclosure. In addition, although advantageous effects of a certain component are not explicitly described in description of the embodiments of the present disclosure, it should be understood that expectable effects by the component are also recognized.

INDUSTRIAL APPLICABILITY

A cart according to the present disclosure may be applied in various ways to a commercial field, a leisure field, a distribution field, and the like.

The invention claimed is:
1. A handle assembly for a cart, the handle assembly comprising:
 a handle bar locatable at one side of a cart to receive an external force applied in a movement direction of the cart; and a force sensing assembly disposed on the handle bar, the force sensing assembly including:
   a frame support movable in a direction of the external force applied to the handle bar; and
   a force sensor located adjacent to the frame support to sense the direction of movement of the frame support,
wherein the force sensor includes:
   a magnet coupled to a side of the frame support, the magnet being movable by the frame support in a direction corresponding to the direction of the external force;
   a sensor printed circuit board (PCB); and
   a Hall sensor located adjacent to the magnet to sense a position of the magnet,
wherein the Hall sensor is mounted to the sensor PCB, and
wherein the sensor PCB is configured to determine the direction of the external force based on a sensing result of the Hall sensor.

2. The handle assembly according to claim 1, wherein the frame support comprises:
   a pair of cover pads disposed on the handle bar;
   a moving bracket connected to the cover pads and receiving the magnet;
   guide brackets disposed under the moving bracket and supporting a lower side of the moving bracket at opposite sides of the moving bracket; and
   a plurality of support pins provided through the moving bracket and lower ends of the guide brackets and supporting the moving bracket to be movable in a movement direction of the cover pads.

3. The handle assembly according to claim 2, wherein the frame support further comprises a base frame receiving the support pins and coupled to an interior of the handle bar.

4. The handle assembly according to claim 3, wherein each cover pad includes a guide plate,
   wherein the frame support further includes an upper frame disposed to face the base frame, and
   wherein the upper frame is coupled to each guide plate to connect the pair of cover pads to each other.

5. The handle assembly according to claim 4, wherein the moving bracket is coupled to the upper frame to allow the magnet to move corresponding to movement of the cover pads and the upper frame.

6. The handle assembly according to claim 3, wherein the guide brackets are disposed under the moving bracket in a longitudinal direction of the base frame and are coupled to the base frame by the support pins, and
   wherein the guide brackets are provided as a pair of guide brackets having a same shape and facing each other.

7. The handle assembly according to claim 3, wherein each of the moving bracket and the guide brackets is formed with through-holes through which the support pins pass.

8. The handle assembly according to claim 2, wherein the force sensor further includes a sensor holder bracket coupled to the sensor PCB, the sensor holder bracket including a plurality of guide protrusions protruding towards the moving bracket to restrict movement of the guide brackets.

9. The handle assembly according to claim 8, wherein the sensor holder bracket further includes:
   a plurality of coupling protrusions coupled to the sensor PCB; and
   a plurality of fastening holes coupled to the base frame by fastening members.

10. A cart comprising:
   a main body including:
      a driver to generate electric power; and
      a controller configured to control the driver;
   a wheel coupled to a lower portion of the main body to move the main body;
   a handle bar provided at one side of the main body to receive an external force applied in a movement direction of the main body; and
   a force sensing assembly disposed on the handle bar, the force sensing assembly including:
      a frame support movable in a direction of the external force applied to the handle bar; and
      a force sensor located adjacent to the frame support to sense a movement direction of the frame support,
   wherein the controller is configured to transfer the electric power generated from the driver to the wheel according to the movement direction of the frame support sensed by the force sensor,
   wherein the force sensor includes:
      a magnet coupled to a side of the frame support, the magnet being movable by the frame support in a direction corresponding to the direction of the external force;
      a sensor printed circuit board (PCB); and
      a Hall sensor located adjacent to the magnet to sense a position of the magnet,
   wherein the Hall sensor is mounted to the sensor PCB, and
   wherein the sensor PCB is configured to determine the direction of the external force based on a sensing result of the Hall sensor.

11. The cart according to claim 10, wherein the frame support comprises:
   a pair of cover pads disposed on the handle bar;
   a moving bracket connected to the cover pads and receiving the magnet;
   guide brackets disposed under the moving bracket and supporting a lower side of the moving bracket at opposite sides of the moving bracket; and
   a plurality of support pins provided through the moving bracket and lower ends of the guide brackets and supporting the moving bracket to be movable in a movement direction of the cover pads.

12. The cart according to claim 11, wherein the frame support further comprises a base frame receiving the support pins and coupled to an interior of the handle bar.

13. The cart according to claim 12, wherein each of the moving bracket and the guide brackets is formed with through-holes through which the support pins pass, and the through-holes of the moving bracket and the guide brackets have a larger diameter than the support pins.

14. The cart according to claim 12, wherein each cover pad includes a guide plate,
   wherein the frame support further includes an upper frame disposed to face the base frame, and
   wherein the upper frame is coupled to each guide plate to connect the pair of cover pads to each other.

15. The cart according to claim 11, wherein the force sensor further includes a sensor holder bracket coupled to the sensor PCB, the sensor holder bracket including a plurality of guide protrusions protruding towards the moving bracket to restrict movement of the guide brackets.

16. The cart according to claim 10, wherein the controller is further configured to control the driver to supply an assistant force to the wheel to provide a power assist function.

17. The cart according to claim 16, wherein the controller is further configured to:
- determine a direction of the external force applied to the cart by a user through the force sensing assembly; and
- control a direction of supplying an assistant force generated from the driver and a rotational direction of the wheel to move the cart in the determined direction of the external force.

18. The cart according to claim 16, wherein the driver is connected to the wheel, and
- wherein the controller is further configured to control a rotational direction of the wheel through communication with the force sensing assembly and the driver or control a power transmission direction of the driver connected to the wheel.

* * * * *